Oct. 10, 1933.  F. E. BERRY  1,929,801
CUTTING TOOL
Filed March 6, 1931
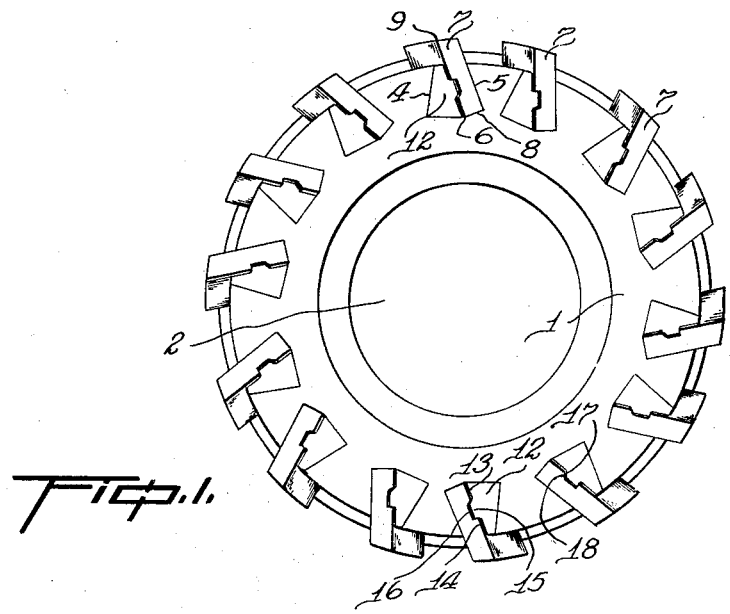
Fig. 1.
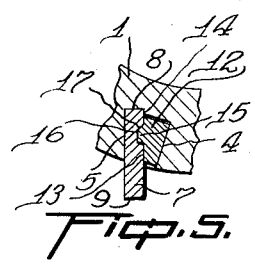
Fig. 5.
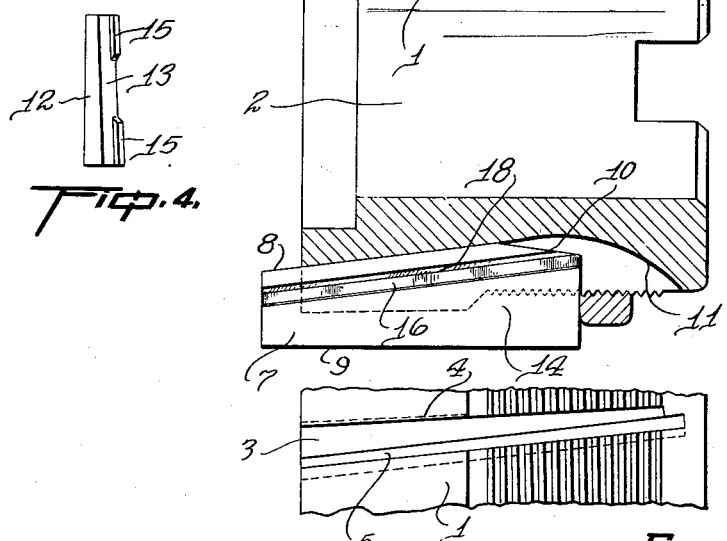
Fig. 2.
Fig. 4.
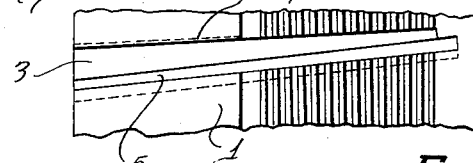
Fig. 3.
INVENTOR
Frank E. Berry
BY
ATTORNEYS Patented Oct. 10, 1933

1,929,801

UNITED STATES PATENT OFFICE 1,929,801

CUTTING TOOL

Frank E. Berry, Detroit, Mich., assignor to Brown-McLaren Manufacturing Company, Detroit, Mich., a corporation of Michigan Application March 6, 1931. Serial No. 520,596

2 Claims. (Cl. 29—105)

The present invention pertains to a novel cutting tool such as a reamer having removable blades.

The principal object of the invention is to provide a device of this character wherein the detachable or separate blades may readily be inserted in a body and locked securely therein. Another object of the invention is to provide a simple and rigid construction for this purpose.

The body of the tool has the requisite number of slots for receiving the blades. Each slot also receives a wedge which has a compound action in locking or binding the blade transversely and in drawing it inwardly against the bottom of the slot. These functions follow respectively from a longitudinal and a transverse taper of the wedge.

The invention is fully disclosed by way of example in the following description and in the accompanying drawing, in which—

Figure 1 is an end view of the tool assembled according to the invention;

Fig. 2 is a longitudinal section of the body, showing one of the blades in position;

Fig. 3 is a fragmentary plan view of the body;

Fig. 4 is a top plan view of the wedge; and

Fig. 5 is a fragmentary cross section of the assembled tool, showing the relation of the wedge and blade.

Reference to these views will now be made by use of like characters which are employed to designate corresponding parts throughout.

In Figures 1 and 2, the body is shown as consisting of a substantially cylindrical member 1 into which blades may be inserted for use as a reamer as will presently appear. The body has an axial bore 2 for receiving a driving spindle in any suitable manner as well known in the art.

In order to receive the cutting blades, the body is formed on its outer surface with a series of longitudinal slots 3 which however are inclined to the axis of the body as shown more clearly in Figure 3. Inasmuch as these slots are alike, a detailed description of only one of them is necessary.

The lateral walls 4 and 5 of the slot converge outwardly of the body as may be clearly seen in Figures 1 and 3. Inasmuch as each wall is formed by a tool having perpendicular cutting sides, one side defining a wall and the other side defining a portion of the bottom, the bottom of the slot consists of two surfaces at an angle to each other and forming a vertex 6. Although there is no limitation to the angular position of the walls 4 and 5, the wall 4 may form an angle of 3° to a line parallel to a radius through the point 6. The wall 5 may form an angle of 15° 12' to a line parallel to a radius through the point 6. Moreover, the walls 4 and 5 also converge lengthwise of the body toward the rear end thereof, and the bottom of the slot has a slope inwardly of the body, toward the rear end as clearly shown in Figure 2. For example, the wall 4 may lie at an angle of 87° and the wall 5 at an angle of 97° to an axial line on the body, and the slope at the bottom of the slot may be 7°.

A cutting blade 7 of high speed steel is adapted for insertion in the slot to engage one of the lateral walls thereof, particularly the wall 5. The inner edge 8 of the blade covers one of the sides of the angular bottom 6 of the slot. This edge also diverges from the outer or cutting edge 9 at an angle equal to the slope of the slot bottom so that the cutting edge is parallel to the axis of the body. Moreover, due to the slope in the bottom of the slot, the effective or cutting radius of the blades is reduced as they are moved towards the rear end of the body. This means enables adjustment of the diameter of the tool within a range of about three-eighths of an inch. The rear end of the blade is relieved at 10 in order not to interfere with the curved run-out 11 at the rear end of the slot.

In order to secure the blade in its slot, there is provided a wedge 12 adapted to engage the wall 4. This wedge tapers transversely and also lengthwise as clearly shown in Figures 4 and 5, and when properly inserted in the slot, the transverse taper is outward of the body and the lengthwise taper is rearward. The inner face 13 of the wedge is shaped to make surface contact with the inner face 14 of the blade. The face 13 is formed with a longitudinal key 15 receivable in a longitudinal slot 16 in the face 14. The slot 16 is parallel to the inner edge of the blade, but the key 15 is not parallel to the lower edge of the wedge, or at least the wedge does not extend to the bottom of the slot when the blade and wedge are assembled in the slot, so that the inward pull of the blade in response to the transverse taper of the wedge, as the wedge is forced rearwardly into the slot, is not obstructed by contact of the wedge with the bottom of the slot. The inner edge 17 of the key, or the edge nearer the center of the body, has an outward slope, and the corresponding wall 18 of the slot 16 is similarly sloped, so that an inward movement of the wedge towards the bottom of the main slot results in a wedging action on the blade towards the wall 5 at the surfaces 17 and 18.

In assembling the device, one blade at a time is laid in the slots, against the wall 5 and resting on the bottom. The width of the lower edge of the blade is such as to cover one of the angularly related surfaces constituting the bottom. The blade is pushed lengthwise into the slot until the cutting edge thereof is slightly more than the required distance from the center of the body. A thrust collar 19 may now be screwed down on the threads 20 of the body until abutting the rear end of the blade. In this position the collar constitutes a stop for locating the other blades as they are inserted. The smaller end of the wedge 12 is now inserted into the forward or larger end of the slot, the key 15 thereof entering the slot 16 as already described. The wedge in this position is driven as far as possible into the slot. In the final position of the wedge, the flat side thereof engages the wall 4 of the slot, while the lengthwise taper of the wedge causes the blade to be jambed against the wall 5. The transverse taper of the wedge draws the blade firmly against the bottom 6 of the slot, especially because of the sliding key connection which causes the blade to follow the inward radial movement of the wedge. If the wedge should continue to move radially inward after the blade has come into firm engagement with the bottom of the slot, this slippage will result in further pressure of the blade against the wall 5 by reason of the sloping surfaces 17 and 18. Finally, the cutting edges of the blades are ground down accurately to the desired cutting radius. To remove a blade a thin piece of steel is held against the rear end of the wedge and struck with a hammer, whereupon the wedge is released so that it and then the blade may be taken out of the slot.

Although a specific embodiment of the invention has been illustrated and described, it will be understood that various alterations in the details of construction may be made without departing from the scope of the invention, as indicated by the appended claims.

What I claim is:—

1. A tool comprising a body having a blade slot, a blade receivable therein and adapted to engage one of the lateral walls of said slot, a wedge receivable endwise in said slot in a direction axial of said body and adapted to engage said blade and the other lateral wall of said slot, said wedge being tapered lengthwise of said body and towards its entering end and tapered again radially outward of said slot, whereby to draw said blade towards the base of said slot and bind it against the first named lateral wall, a key formed longitudinally on the side of said wedge contacting with said blade, the contacting side of the blade having a slot for receiving said key, the inner longitudinal edge of said key being sloped outwardly and transversely of said head.

2. A tool comprising a body having a blade slot, a blade receivable therein and adapted to engage one of the lateral walls of said slot, a wedge receivable endwise in said slot in a direction axial of said body and adapted to engage said blade and the other lateral wall of said slot, said wedge being tapered lengthwise of said body and towards its entering end and tapered again radially outward of said slot, whereby to draw said blade towards the base of said slot and bind it against the first named lateral wall, a key formed longitudinally on the side of said wedge contacting with said blade, the contacting side of the blade having a slot for receiving said key, the inner longitudinal edge of said key being sloped outwardly and transversely of said head, the inner longitudinal wall of the slot in the blade being shaped for surface contact with said inner edge of said key.

FRANK E. BERRY.